(12) United States Patent
Cameron et al.

(10) Patent No.: US 7,788,499 B2
(45) Date of Patent: Aug. 31, 2010

(54) SECURITY TOKENS INCLUDING DISPLAYABLE CLAIMS

(75) Inventors: Kim Cameron, Bellevue, WA (US); Arun K. Nanda, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 990 days.

(21) Appl. No.: 11/312,920

(22) Filed: Dec. 19, 2005

(65) Prior Publication Data

US 2007/0143835 A1 Jun. 21, 2007

(51) Int. Cl.
*G06F 21/00* (2006.01)

(52) U.S. Cl. .......................... 713/185; 726/28; 726/29; 726/30

(58) Field of Classification Search ................. 713/185; 726/28, 29, 30
See application file for complete search history.

(56) References Cited

U.S. PATENT DOCUMENTS

| | | | |
|---|---|---|---|
| 5,442,704 A | 8/1995 | Holtey | |
| 5,678,015 A | 10/1997 | Goh | |
| 6,005,939 A * | 12/1999 | Fortenberry et al. | 705/76 |
| 6,161,125 A | 12/2000 | Traversat et al. | |
| 6,553,494 B1 | 4/2003 | Glass | |
| 6,785,810 B1 | 8/2004 | Lirov et al. | |
| 6,810,480 B1 | 10/2004 | Parker et al. | |
| 6,879,769 B1 | 4/2005 | Kawai et al. | |
| 6,934,841 B2 | 8/2005 | Boyles et al. | |
| 6,934,913 B2 | 8/2005 | Le et al. | |
| 6,993,659 B2 | 1/2006 | Milgramm et al. | |
| 7,007,298 B1 | 2/2006 | Shinzaki et al. | |
| 7,047,418 B1 | 5/2006 | Ferren et al. | |
| 7,069,447 B1 | 6/2006 | Corder | |
| 7,103,773 B2 | 9/2006 | Erickson et al. | |
| 7,162,475 B2 | 1/2007 | Ackerman | |
| 7,409,543 B1 * | 8/2008 | Bjorn | 713/155 |
| 2001/0054148 A1 | 12/2001 | Hoornaert et al. | |
| 2002/0010862 A1 | 1/2002 | Ebara | |
| 2002/0124115 A1 | 9/2002 | McLean et al. | |
| 2002/0175916 A1 | 11/2002 | Nichols et al. | |
| 2003/0149781 A1 | 8/2003 | Yared | |
| 2003/0172090 A1 | 9/2003 | Asunmaa et al. | |

(Continued)

FOREIGN PATENT DOCUMENTS

EP 0 767 418 A1 4/1997

(Continued)

OTHER PUBLICATIONS

About Authentication, http://www.Microsoft.com/windows2000/en/server/iis/default.asp?url=/windows2000/en/server/iis/htm/core/iiabasc.htm, pp. 1-5, last updated Feb. 28, 2000.

(Continued)

*Primary Examiner*—Nasser Moazzami
*Assistant Examiner*—Ghazal Shehni
(74) *Attorney, Agent, or Firm*—Merchant & Gould P.C.

(57) ABSTRACT

A system for providing a digital identity includes a claims transformer programmed to generate a security token including a computational token and a display token, the computational token including one or more claims associated with an identity of a principal, and the display token including display information about the claims in the computational token. The display information is configured to allow the principal to view the display token.

11 Claims, 11 Drawing Sheets

U.S. PATENT DOCUMENTS

| | | |
|---|---|---|
| 2003/0177356 A1 | 9/2003 | Abela |
| 2003/0200175 A1 | 10/2003 | Wang et al. |
| 2003/0200217 A1 | 10/2003 | Ackerman |
| 2004/0010720 A1 | 1/2004 | Singh et al. |
| 2004/0111520 A1 | 6/2004 | Krantz et al. |
| 2004/0230831 A1 | 11/2004 | Spelman et al. |
| 2004/0250084 A1 | 12/2004 | Hamid |
| 2005/0059494 A1 | 3/2005 | Kammler |
| 2005/0091492 A1 | 4/2005 | Benson et al. |
| 2005/0108575 A1 | 5/2005 | Yung |
| 2005/0124320 A1 | 6/2005 | Ernst et al. |
| 2005/0125677 A1* | 6/2005 | Michaelides ............. 713/185 |
| 2005/0125678 A1 | 6/2005 | Shaw et al. |
| 2005/0152544 A1 | 7/2005 | Kizawa |
| 2005/0182741 A1 | 8/2005 | Grossman et al. |
| 2005/0183566 A1 | 8/2005 | Nash |
| 2006/0010007 A1 | 1/2006 | Denman et al. |
| 2006/0104486 A1 | 5/2006 | Le Saint |
| 2006/0129509 A1 | 6/2006 | Gaines et al. |
| 2006/0206723 A1 | 9/2006 | Gil |
| 2006/0206724 A1 | 9/2006 | Schaufele et al. |
| 2007/0204168 A1 | 8/2007 | Cameron et al. |
| 2007/0204325 A1 | 8/2007 | Cameron et al. |
| 2008/0289020 A1 | 11/2008 | Cameron et al. |

FOREIGN PATENT DOCUMENTS

| | | | |
|---|---|---|---|
| EP | 0 944 218 A1 | 9/1999 | |
| JP | 63-242751 A | 10/1988 | |
| WO | WO0129641 A2 | 4/2001 | |
| WO | WO 03-053123 A2 | 7/2003 | |
| WO | WO 2004/057796 A1 | 7/2004 | |
| WO | WO 2008/144204 A1 | 11/2008 | |

OTHER PUBLICATIONS

Benjamin, Henry, CCIE Self-Study: Security Protocols, Extensible Authentication Protocol, Protected EAP, and Temporal Key Integrity Protocol, http://www.ciscopress.com/articles/article.asp?p=422947&seqNum=7&rl=1, pp. 1-4, Oct. 28, 2005.

Notification of Transmittal of the International Search Report and the Written Opinion of the International Searching Authority mailed Apr. 20, 2007, 11 pages.

A Guide to Integrating with InfoCard v1.0, *Microsoft Corporation*, pp. 1-62 (Aug. 2005).

A Technical Reference for InfoCard v1.0 in Windows, *Microsoft Corporation*, pp. 1-36 (Aug. 2005).

Access Control Smart Card: Two-Factor Authentication for the Enterprise Logical Access Control for the Enterprise, pp. 1-2, accessed Jul. 12, 2006, accessed at: http://www.cardwerk.com/smart-card-solutions/logical-access-control/.

Andy Harjanto's InfoCard WebLog, *MSDN Blogs*, 3 pages, accessed Nov. 22, 2005, accessed at: http://blogs.msdn.com/andyhar/archive/2005/11/22/495649.aspx.

Audio-Visual Multimodal Fusion for Biometric Person Authentication and Live ness Verification, 8 pages, accessed Jun. 12, 2007, accessed at: http://deliverFy.acm.org/10.1145/1160000/1151808/p17-chetty.pdf?key1=1151808&key2=9045972611&coll=GUIDE&dl=GUIDE&CFID=75919783&CFTOKEN=92791909.

Cameron, K., "The Laws of Identity," *Architect of Identity, Microsoft Corporation*, May 12, 2005, pp. 1-12.

Chappell, Introducing InfoCard, Apr. 2006, pp. 1-16, http://msdn.microsoft.com/winfx/reference/infocard/default.aspx?pull=/library/en-us/dnlong/html/introinfocard.asp.

European Search Report cited in Application No. 06838382.7 mailed Sep. 18, 2009.

Evans, D. et al., "Private key infrastructure: balancing computer transmission privacy with changing technology and security demans," *Computer Standards & Interfaces*, vol. 27, (2005) pp. 423-437.

Hunt, R., "Technological infrastructure for PKI and digital certification," *Computer Communications*, vol. 24, (2001) pp. 1460-1471.

Jøsang, A. et al., "What You See is Not Always What You Sign," *Proceedings of AUUG2002*, Melbourne, Australia, (Sep. 4-6, 2002) pp. 1-13.

Lancaster, S. et al., "Public key infrastructure: a micro and macro analysis," *Computer Standards & Interfaces*, vol. 25, (2003) pp. 437-446.

Q&A: Microsoft's Kim Cameron Wins 'Balancing Innovation and Reality' Award for Contributions to Digital Identity, *Microsoft PressPass*, (May 12, 2005) 3 pages.

U.S. Non-Final Office Action cited in U.S. Appl. No. 11/361,281 mailed Jun. 23, 2009.

U.S. Non-Final Office Action cited in U.S. Appl. No. 11/495,830 mailed Jul. 16, 2009.

What is Microsoft InfoCard?, *Johannes Ernst's Blog*, (May 18, 2005) pp. 1-4.

US Final Office Action cited in U.S. Appl. No. 11/495,830 mailed Jan. 21, 2010.

International Search Report cited in PCT/EP 00/10284 mailed Aug. 20, 2001.

US Final Office Action cited in U.S. Appl. No. 11/361,281 mailed Jan. 21, 2010.

\* cited by examiner

SECURITY TOKENS INCLUDING DISPLAYABLE CLAIMS

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Identity is an important component enabling interactions in everyday life. For example, an individual's credit card enables merchants to identify and allow the individual to purchase products and services on credit. The same is true in the digital world as well, where digital identity enables digital interactions. For example, digital identities can be used to authenticate parties to each other in the digital environment. Knowing with whom one is interacting is an important element in deciding whether or not to trust and provide information to a party.

An entity can use a digital identity to authenticate a party's identity or other personal information about the party. A digital identity can be issued by another entity and include information about the party. Examples of such information include the party's name, address, social security number, age, telephone number, etc. A party can have multiple digital identities issued by one or more other entities, similar to that of an individual having a driver's license, a credit card, and a frequent flyer card.

The party can use a digital identity to identity itself to a third party. For example, a third party, such as an online service, can require that the party authenticate its identity before the third party allows the party to access goods or services. In order to authenticate its identity, the party can forward to the third party a digital identity in the form of a security token issued by another entity trusted by the third party. Once authentication is complete, the third party can provide access to the goods or services requested by the party.

In many cases, the party has little or no ability to control or view the contents of a security token issued by another entity. When the party shares a security token with a third party during authentication of the party's identity, the party's privacy can become a concern. For example, without knowledge of the contents of the security token, the party can unknowingly share personal information in the security token with the third party that the party does not need to share for authentication. In addition, the party can unknowingly provide personal information that the party does not want to share with the third party (e.g., social security number, telephone number, etc.).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect relates to a system for providing a digital identity that includes a claims transformer programmed to generate a security token including a computational token and a display token, the computational token including one or more claims associated with an identity of a principal, and the display token including display information about the claims in the computational token. The display information is configured to allow the principal to view the display token.

Another aspect relates to a method for providing a digital identity, the method including: receiving a security token including a computational token and a display token, the computational token including one or more claims associated with an identity of a principal, and the display token including display information about the claims in the computational token; and displaying the display information in the display token for the principal so that the principal can review the contents of the display token.

Yet another aspect relates to a computer-readable medium having computer-executable instructions for performing steps including: generating a security token including receiving a security token including a computational token and a display token, the computational token including one or more claims associated with an identity of a principal, and the display token including display information about the claims in the computational token; and displaying the display information in the display token for the principal so that the principal can review the contents of the display token.

DESCRIPTION OF THE DRAWINGS

Reference will now be made to the accompanying drawings, which are not necessarily drawn to scale, and wherein.

DETAILED DESCRIPTION

Example embodiments will now be described more fully hereinafter with reference to the accompanying drawings. These embodiments are provided so that this disclosure will be thorough and complete. Like numbers refer to like elements throughout.

Example embodiments disclosed herein relate generally to digital identities that can be exchanged between a first party and a second party to authenticate an identity and/or information related to the first party. In example embodiments herein, the first party can be an individual, a company, an organization, a computer or other device, a service, or any other type of entity. The first party is referred to herein as the principal. In example embodiments, the second party has goods, services, or other information that the principal desires to access and/or obtain. The second party is referred to herein as the relying party.

Figure 1:
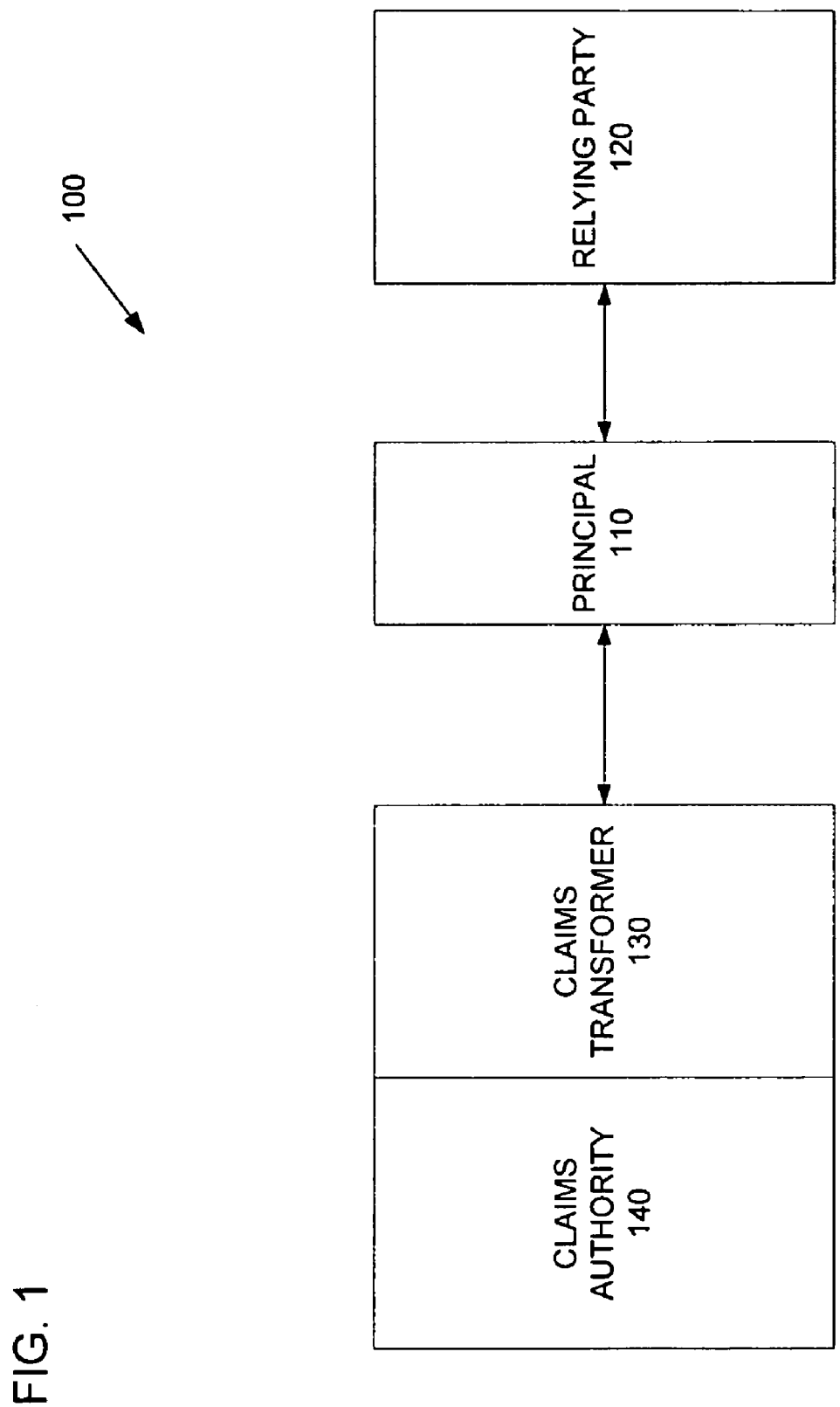
FIG. 1 illustrates an example digital identity system.

Referring now to FIG. 1, an example digital identity system 100 is shown including a principal 110 and a relying party 120. Principal 110 and relying party 120 can communicate with each other over one or more networks, as described further below. In example embodiments, principal 110 can request goods, services, or other information from relying party 120, and relying party 120 can require authentication of the identity of or information about principal 110 before or in conjunction with providing the requested goods, services, or information.

Also shown in FIG. 1 are a claims transformer 130 and a claims authority 140 (sometimes referred to as a security token service or "STS"). In the example shown, claims transformer 130 and claims authority 140 are one or more entities that can provide one or more claims or assertions about a principal. A claim is a statement made about the principal related to the principal's identity or information about the principal such as, for example, name, address, social security number, age, etc. As described further below, claims transformer 130 and claims authority 140 can provide claims to the principal 110 and/or the relying party 120 in the form of a signed security token.

In example embodiments, claims authority 140 is in a trusted relationship with relying party 120 so that relying party 120 trusts the claims in the signed security token from claims authority 140.

Although claims transformer 130 and claims authority 140 are shown as separate entities in FIG. 1, in alternative embodiments claims transformer 130 and claims authority 140 can be the same entity or different entities. In addition, although claims transformer 130 is illustrated as being in communication with principal 110, in alternative embodiments, relying party 120 can communicate directly with claims transformer 130, as described further below.

In example embodiments disclosed herein, system 100 is implemented as an InfoCard system provided in the WINFX application programming interface developed by Microsoft Corporation of Redmond, Wash. The InfoCard system allows principals to manage multiple digital identities from various claims authorities.

The InfoCard system utilizes a web services platform such as the Windows Communication Foundation in the WINFX application programming interface. In addition, the InfoCard system is built using the Web Services Security Specifications propagated at least in part by Microsoft Corporation of Redmond, Wash. These specifications include a message security model WS-Security, an endpoint policy WS-SecurityPolicy, a metadata protocol WS-MetadataExchange, and a trust model WS-Trust. Generally, the WS-Security model describes how to attach security tokens to messages. The WS-SecurityPolicy model describes end point policy requirements, such as required security tokens and supported encryption algorithms, implemented using a metadata protocol WS-MetadataExchange. The WS-Trust model describes a framework for trust models that enable different web services to interoperate.

Example embodiments described herein refer to the Web Services Security Specifications described above. In alternative embodiments, one or more different specifications can be used to facilitate communications between the various elements in system 100.

Figure 2:
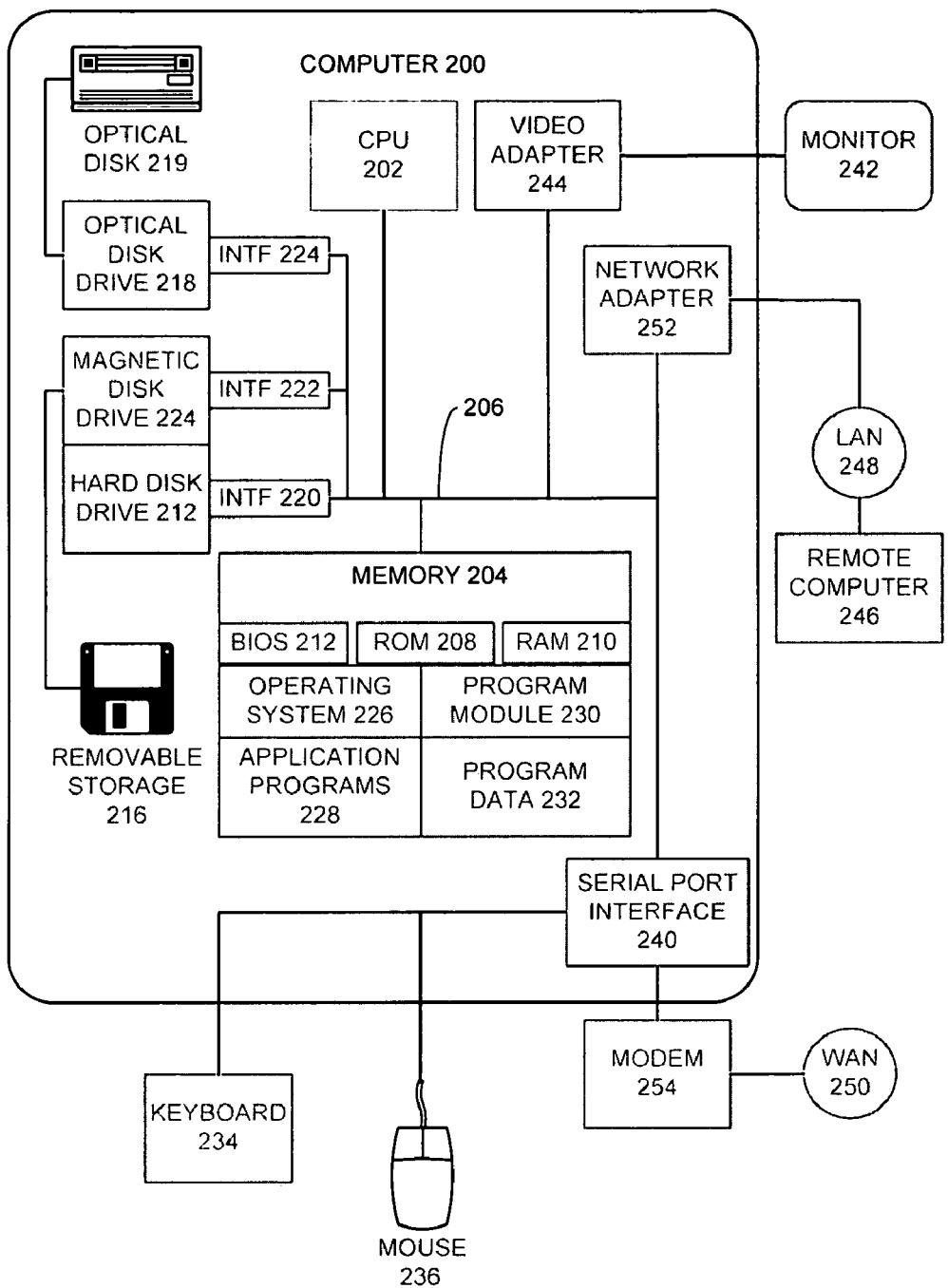
FIG. 2 illustrates an example general purpose computer system.

Referring now to FIG. 2, in one example embodiment, principal 110 is an individual that uses a computer system such as an example computer system 200 to communicate with relying party 120 and claims transformer 130. Computer system 200 can take a variety of forms such as, for example, a desktop computer, a laptop computer, and a hand-held computer. In addition, although computer system 200 is illustrated, the systems and methods disclosed herein can be implemented in various alternative computer systems as well.

The system 200 includes a processor unit 202, a system memory 204, and a system bus 206 that couples various system components including the system memory 204 to the processor unit 202. The system bus 206 can be any of several types of bus structures including a memory bus, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the computer system 200, is stored in ROM 208.

The computer system 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the computer system 200.

Although the example environment described herein can employ a hard disk 212, a removable magnetic disk 216, and a removable optical disk 219, other types of computer-readable media capable of storing data can be used in the example system 200. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 212, magnetic disk 216, optical disk 219, ROM 208, or RAM 210, including an operating system 226 such as the WINDOWS operating system from Microsoft Corporation, one or more application programs 228, other program modules 230, and program data 232.

A user may enter commands and information into the computer system 200 through input devices such as, for example, a keyboard 234, mouse 236, or other pointing device. Examples of other input devices include a toolbar, menu, touch screen, microphone, joystick, game pad, pen, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). An LCD display 242 or other type of display device is also connected to the system bus 206 via an interface, such as a video adapter 244. In addition to the display 242, computer systems can typically include other peripheral output devices (not shown), such as speakers and printers.

The computer system 200 may operate in a networked environment using logical connections to one or more remote computers, such as a remote computer 246. The remote computer 246 may be a computer system, a server, a router, a network PC, a peer device or other common network node, and typically includes many or all of the elements described above relative to the computer system 200. The network connections include a local area network (LAN) 248 and a wide area network (WAN) 250. Such networking environments are commonplace in offices, enterprise-wide computer networks, intranets, and the Internet.

When used in a LAN networking environment, the computer system 200 is connected to the local network 248 through a network interface or adapter 252. When used in a WAN networking environment, the computer system 200 typically includes a modem 254 or other means for establishing communications over the wide area network 250, such as the Internet. The modem 254, which can be internal or external, is connected to the system bus 206 via the serial port interface 240. In a networked environment, program modules depicted relative to the computer system 200, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the disclosure. This software, firmware, or similar sequence of computer instructions may be encoded and stored upon computer readable storage medium and may also be encoded within a carrier-wave signal for transmission between computing devices.

Figure 3:
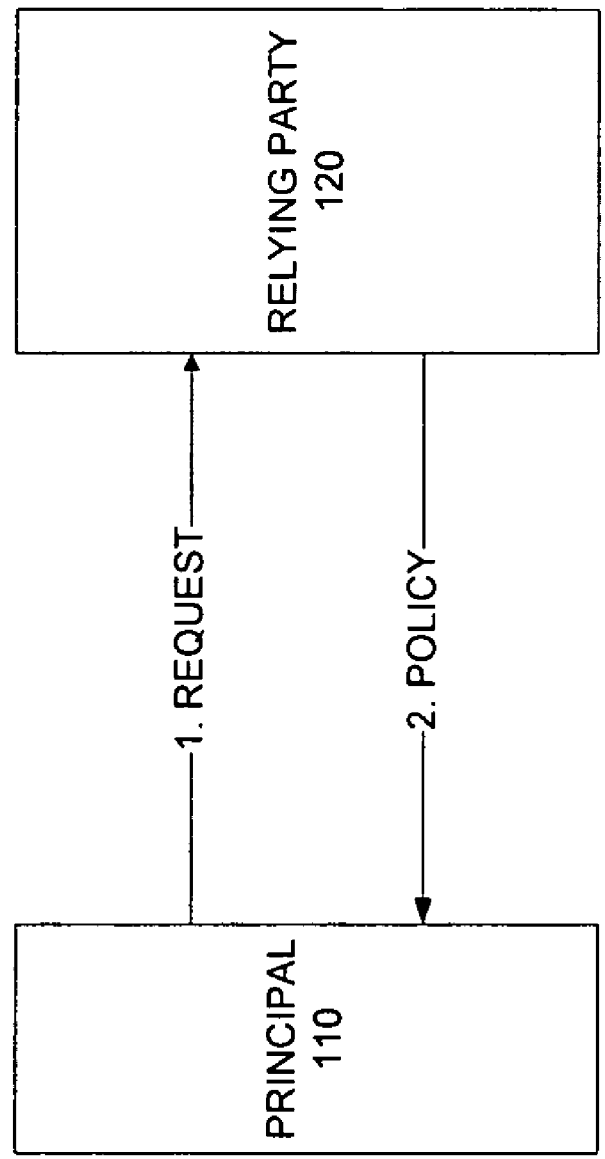
FIG. 3 illustrates a portion of the system of FIG. 1.

Referring now to FIG. 3, example principal 110 and relying party 120 are again shown. Principal 110 can communicate with relying party 120 using, for example, a computer system 300 (see FIG. 6) that is similar to computer system 200 described above. In the example shown, principal 110 uses computer 300 to send a request to relying party 120 for goods, services, or other information. For example, in one embodiment, principal 110 sends a request to relying party 120 for access to information that principal 110 desires.

The request sent by principal 110 can include a request for the security policy of relying party 120 using, for example, the mechanisms provided in WS-MetadataExchange. In response to the request, relying party 120 sends principal 110 requirements for relying party 120 to authenticate the identity or other information about principal 110. The requirements of relying party 120 for authentication are referred to herein as a security policy. The security policy defines the set of claims that the principal 110 must provide to relying party 120 for relying party 120 to authenticate principal 110.

In one example, relying party 120 specifies its security policy using WS-SecurityPolicy, including both the claim requirements and type of security token required by relying party 120. A basic form for a security policy in accordance with WS-SecurityPolicy is illustrated in the example below.

```
<sp:IssuedToken ... >
    <sp:RequestSecurityTokenTemplate>
        <wst:TokenType>
            urn:oasis:names:tc:SAML:1.0:assertion
        </wst:TokenType>
        <wst:Claims
            wst:Dialect="http://schemas.microsoft.com/ws/2005/05/identity">
            <ic:Claim
            URI="http:// ... /ws/2005/05/identity/claims/givenname"/>
        </wst:Claims>
    </sp:RequestSecurityTokenTemplate>
</sp:IssuedToken>
```

In this example, one claim regarding the given name of the principal is required by the security policy for authentication. Examples of other types of claims include, without limitation, the following:

First Name—Type: xs:string—preferred name or first name of a subject;

Last Name—Type: xs:string—surname or family name of a subject;

Email Address—Type: xs:string—preferred address for the "To:" field of email to be sent to the subject, usually of the form <user>@<domain>;

Street Address—Type: xs:string—street address component of a subject's address information;

Locality Name or City—Type: xs:string—locality component of a subject's address information;

State or Province—Type: xs:string—abbreviation for state or province name of a subject's address information;

Postal Code—Type: xs:string—postal code or zip code component of a subject's address information;

Country—Type: xs:string—country of a subject;

Primary or Home Telephone Number—Type: xs:string—primary or home telephone number of a subject;

Secondary or Work Telephone Number—Type: xs:string—secondary or work telephone number of a subject;

Mobile Telephone Number—Type: xs:string—mobile telephone number of a subject;

Date of Birth—Type: xs:date—the date of birth of a subject in a form allowed by the xs:date data type;

Gender—Type: xs:token—gender of a subject that can have any of these exact string values—"Male," "Female" or "Unspecified;" and Private Personal Identifier—Type: xs:base64binary—indicates a private identifier that identifies the subject to a relying party.

The policy can also be used to specify the type of security token required by relying party 120, or a default type can be used as specified by WS-Trust. For example, the above-noted policy specifies a certain type of security token that is required by relying party 120 (i.e., "wst:TokenType").

In addition to specifying the required claims and token type, the security policy can specify a specific claims authority required by the relying party ("sp:Issuer"), as shown below.

```
<sp:IssuedToken sp:Usage="xs:anyURI" sp:IncludeToken="xs:anyURI"
...>
    <sp:Issuer>
        <wsa:EndpointReference>...</wsa:EndpointReference>
    </sp:Issuer>
    <sp:RequestSecurityTokenTemplate>
        ...
    </sp:RequestSecurityTokenTemplate>
    <wsp:Policy>
        ...
    </wsp:Policy>
    ...
</sp:IssuedToken>
```

The policy can omit this element, leaving a determination of the appropriate claims authority up to the principal.

Other elements can be specified in the security policy as well such as, for example, the freshness of the required security token.

Figure 4:
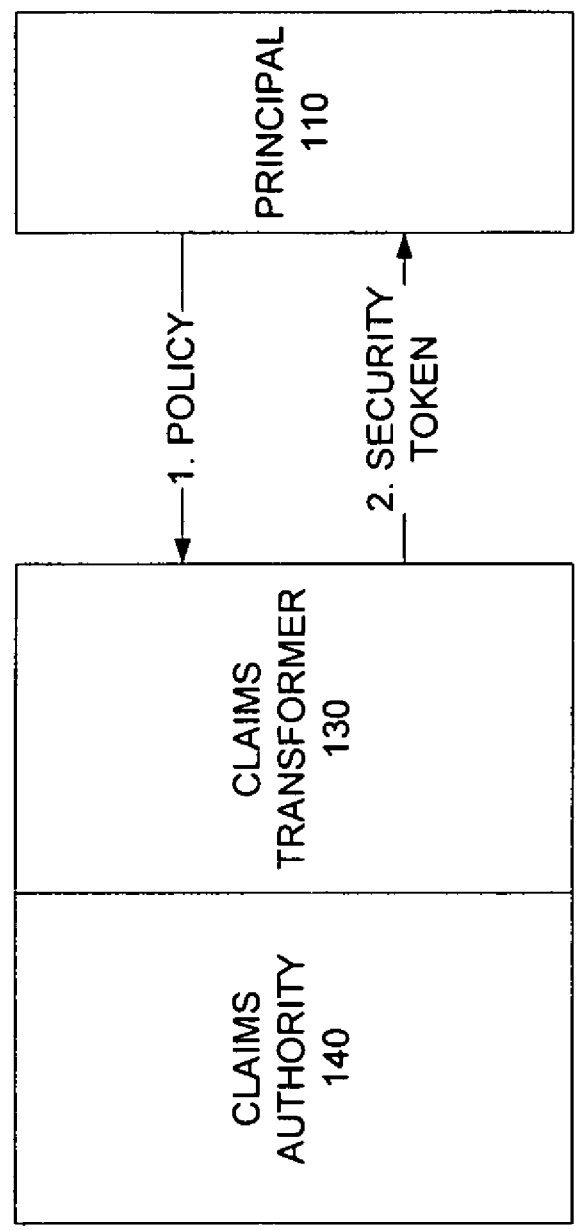
FIG. 4 illustrates another portion of the system of FIG. 1.

Referring now to FIG. 4, once principal 110 receives the security policy from relying party 120, principal 110 can communicate with one or more claims authorities to gather the claims required by the policy. In the example shown, principal 110 communicates the requirements of the security policy to claims transformer 130 and claims authority 140.

For example, principal 110 can request one or more security tokens from claims authority 140 using the issuance mechanism described in WS-Trust. In one example, principal 110 forwards the claim requirements in the policy of relying party 120 to claim authority 140. The identity of relying party 120 can, but need not, be specified in the request sent by principal 110 to the claims authority 140. The request can include other requirements as well, such as a request for a display token, as described further below.

An example of a request for a security token is provided below.

```
<wst:RequestSecurityToken>
    <wst:TokenType>
        urn:oasis:names:tc:SAML:1.0:assertion
    </wst:TokenType>
    <wst:Claims
        wst:Dialect="http://schemas.microsoft.com/ws/2005/
        identity">
        <ic:Claim
            URI="http://.../ws/2005/05/identity/claims/givenname"/>
    </wst:Claims>
</wst:RequestSecurityToken>
```

In example embodiments, claims authority 140 can have its own security policy as specified in WS-SecurityPolicy and require authentication of principal 110 before claims authority 140 forwards a security token to principal 110.

Claims authority 140 can provide one or more of the claims required by the policy from relying party 120. For example, claims authority 140 is programmed to generate one or more claims required by the policy. Claims transformer 130 is programmed to translate the claims of claims authority 140 into one or more claims that can be understood by relying party 120. In example embodiments, claims transformer 130 generates one or more signed security tokens 150 that include the one or more claims, as described below.

The security token 150 can then be forwarded to principal 110. In example embodiments, claims transformer 130 forwards the security token 150 to principal 110 using the response mechanisms described in WS-Trust.

Figure 5:
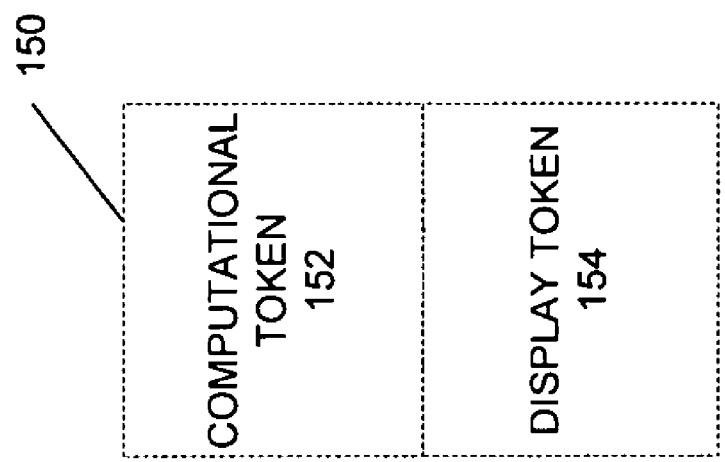
FIG. 5 illustrates an example security token.

Referring now to FIG. 5, an example security token 150 is shown. In the embodiment shown, security token 150 includes a computational token 152 and a display token 154. Computational token 152 includes the claims provided by claims authority 130 in an encrypted format. In example embodiments, claims transformer 130 generates computational token 152 in an encrypted format that can be understood (i.e., decrypted) by relying party 120, as described below.

Claims transformer 130 also generates display token 154. Generally, display token 154 includes at least a summary of the claims that are included in computational token 152 of security token 150. For example, in some embodiments, display token 154 includes a list of all of the claims included in computational token 152. Display token 154 can be generated in a format that can be reviewed by principal 110 using, for example, computer system 300, as described below. In some examples, display token 154 is generated in a plain text format or a Hypertext Markup Language ("HTML") format. One example of an embodiment of a display token included as part of a security token response is shown below.

```
<ic:RequestedDisplayToken>
    <ic:DisplayToken xml:lang="en-us">
        <ic:DisplayClaim
        URI="http://.../ws/2005/05/identity/claims/givenname">
            <ic:DisplayTag>Given Name</ic:DisplayTag>
            <ic:DisplayValue>John</ic:DisplayValue>
        </ic:DisplayClaim>
        <ic:DisplayClaim
        URI="http://.../ws/2005/05/identity/claims/surname">
            <ic:DisplayTag>Last Name</ic:DisplayTag>
            <ic:DisplayValue>Doe</ic:DisplayValue>
        </ic:DisplayClaim>
    <ic:DisplayToken>
</ic:RequestedDisplayToken>
```

The following is a general description of the elements shown above in the display token:

/ic:RequestedDisplayToken/ic:DisplayToken—the returned display token;

/ic:RequestedDisplayToken/ic:DisplayToken/@xml: lang—this attribute indicates a language identifier, using the language codes specified in RFC 3066, in which the display token content is localized;

/ic:RequestedDisplayToken/ic:DisplayToken/ic:Display-Claim—this element indicates an individual claim returned in the security token;

/ic:RequestedDisplayToken/ic:DisplayToken/ic:Display-Claim/@URI—this attribute provides the unique identifier (URI) of the individual claim returned in the security token;

/ic:RequestedDisplayToken/ic:DisplayToken/ic:Display-Claim/ic:DisplayTag—this optional element provides a common or friendly name for the claim returned in the security token;

/ic:RequestedDisplayToken/ic:DisplayToken/ic:Display-Claim/ic:Description—this optional element provides a description of the semantics for the claim returned in the security token;

/ic:RequestedDisplayToken/ic:DisplayToken/ic:Display-
Claim/ic:DisplayValue—this optional element provides one or more displayable values for the claim returned in the security token; and /ic:RequestedDisplayToken/ic:DisplayToken/ic:Display-
TokenText (not shown)—this optional element provides an alternative textual representation of the entire token as a whole when the token content is not suitable for display as individual claims.

In some embodiments, security token 150 including computational token 152 is issued in accordance with the Security Assertion Markup Language ("SAML") standard promulgated by the Organization for the Advancement of Structured Information Standards ("OASIS"). For example, security token 150 can be issued in accordance with SAML 1.1 or SAML 2.0 standards. Other standards can also be used such as, for example and without limitation, an X.509 certificate and a Kerberos ticket.

In addition, security token 150 can be cryptographically signed or endorsed by claims transformer 130 using a known algorithm. In one embodiment, for example and without limitation, a 2048-bit asymmetric RSA key is used. In other embodiments, other encryption algorithms can be used such as, for example, a base 64 encoded symmetric encryption key. In one embodiment, a symmetric key is used by default. In this manner, in the example shown, a party such as relying party 120 can cryptographically verify that security token 150 originated from claims transformer 140.

In example embodiments, computational token 152 is cryptographically bound to display token 154 using one or more known algorithms such as, for example and without limitation, using a digital signature over the entire response message from the claims authority containing both the computational token 152 and the display token 154.

Figure 6:
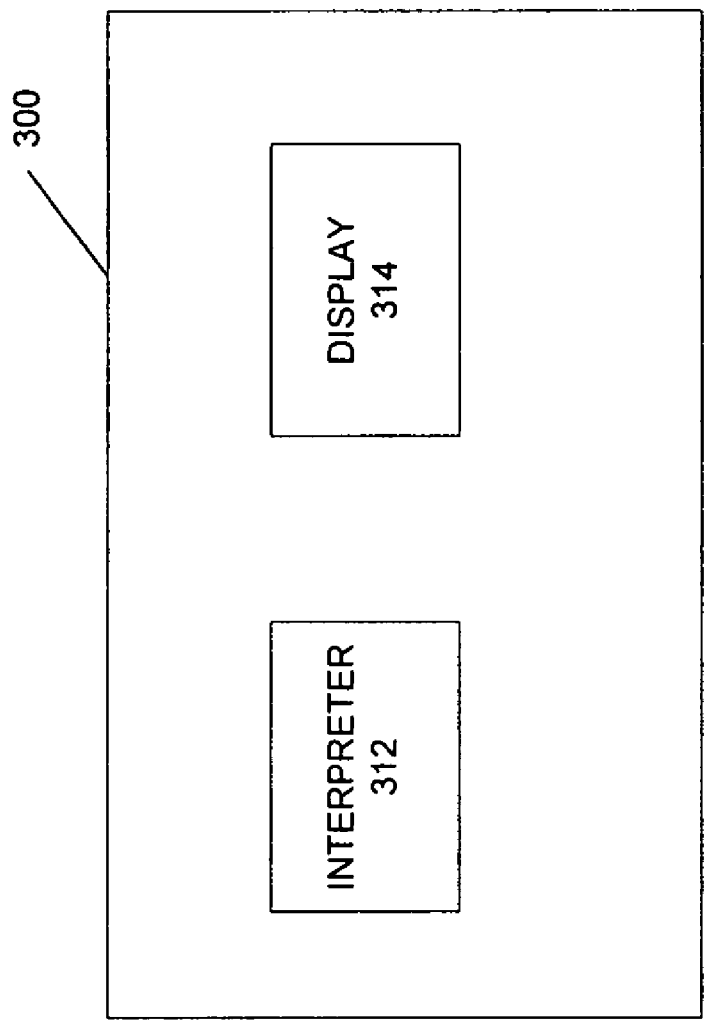
FIG. 6 illustrates an example computer system programmed to interpret and display a display token of a security token.

Referring now to FIG. 6, example computer system 300 of principal 110 can include an interpreter 312 and a display 314. For example, in the illustrated embodiment, interpreter 312 can be one or more application programs (see, e.g., programs 228 described above) executable by computer system 300. In addition, display 314 can be an output device such as a printer or monitor (see, e.g., monitor 242) that can output information to principal 110.

In example embodiments, interpreter 312 is programmed to interpret display token 152 of security token 150. For example, interpreter 312 can identify the claims that are summarized in display token 152, and interpreter 312 can display the claims for principal 110 using display 314. As described further below, principal 110 can utilize the summary of the claims included in security token 150 provided on display 314 to make a decision as to whether or not to share security token 150 with relying party 120.

Figure 7:
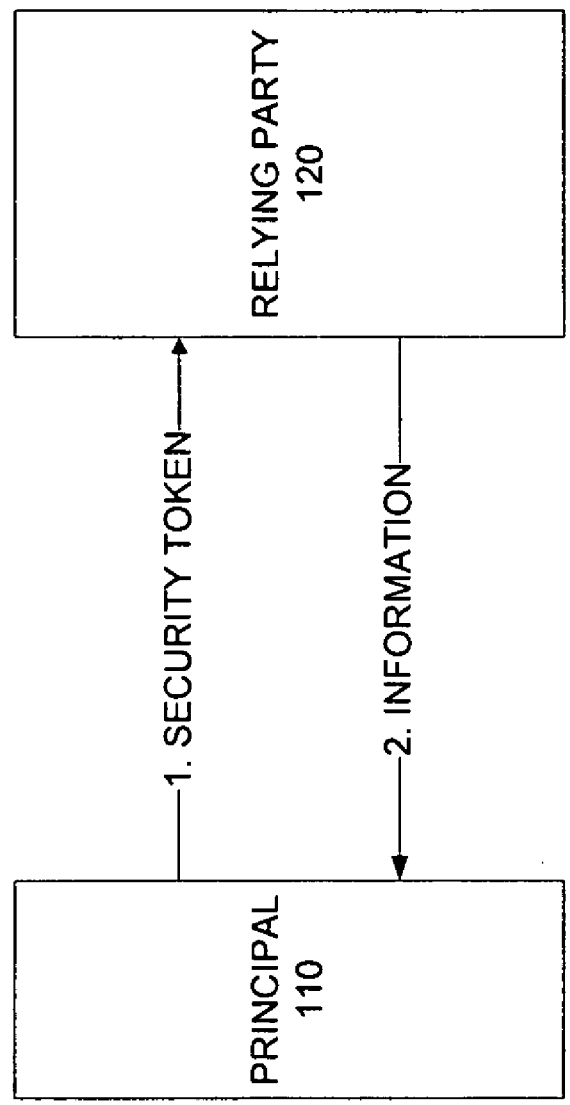
FIG. 7 illustrates another portion of the system of FIG. 1.

Referring now to FIG. 7, principal 110 can forward security token 150 to relying party 120 to satisfy all or a part of the security policy of relying party 120. In one example, principal 110 can forward security token 150 to relying party 120 by binding security token 150 to an to application message using the security binding mechanisms described in WS-Security.

Once relying party 120 receives security token 150, relying party 120 can cryptographically verify the origin of signed security token 150. Relying party 120 can also utilize the claims in computation token 152 of security token 150 to satisfy the security policy of relying party 120 to authenticate principal 110. Once authentication is complete, relying party 120 can provide access to the goods, services, or other information requested by principal 110.

Figure 8:
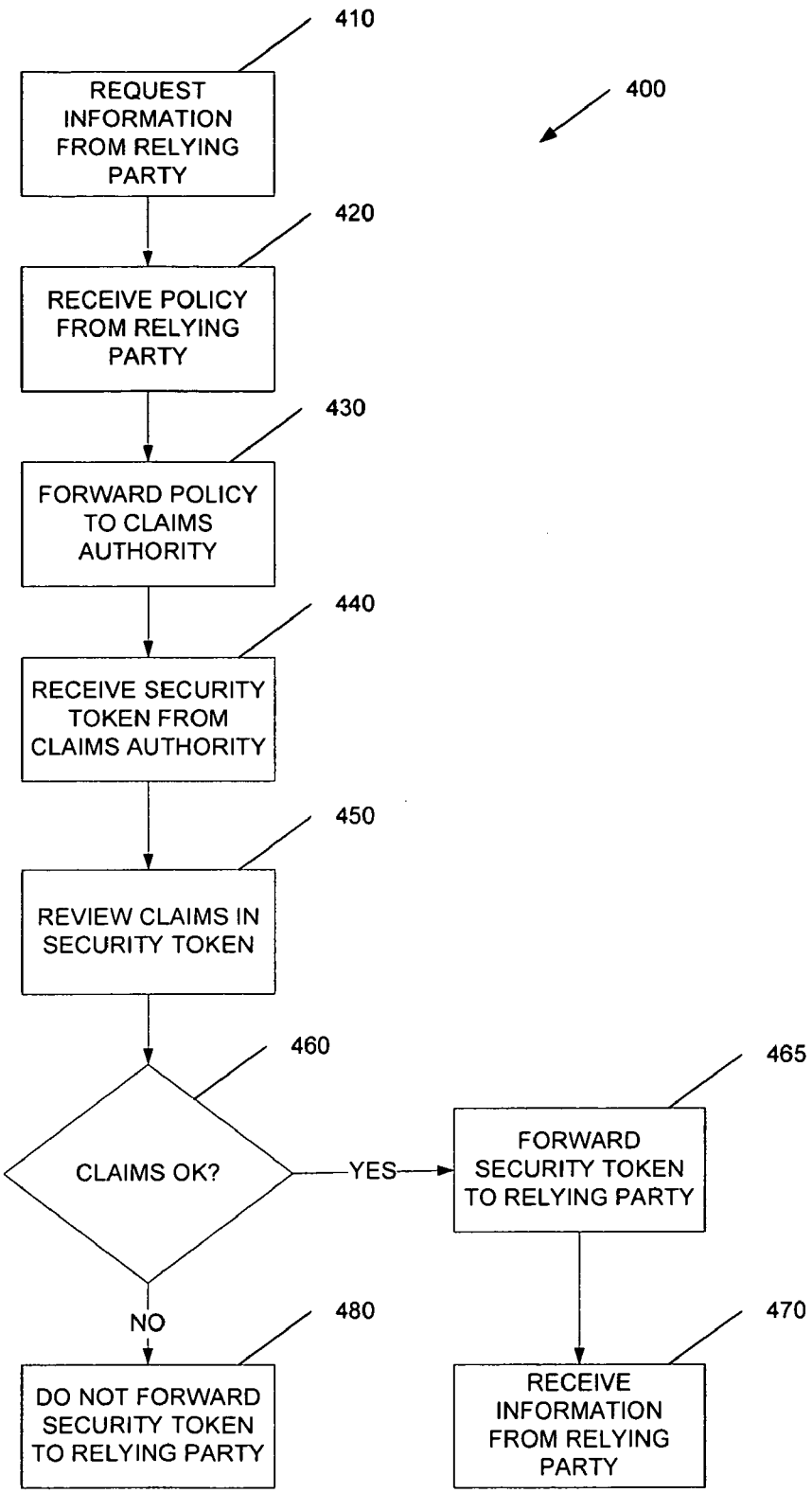
FIG. 8 illustrates an example method for authenticating a principal.

Referring now to FIG. 8, an example method 400 for authenticating a principal is shown. Method 400 is described with reference to a non-limiting example wherein the principal is Employee A. Employee A is an employee of a company referred to as "Company A," and the relying party is a travel agency referred to as "Travel Agency A." Company A has partnered with Travel Agency A for making travel arrangements for employees of Company A at discounted rates.

At operation 410 of method 400, a principal requests information from a relying party. For example, in the illustrated embodiment, Employee A utilizes an application program on Employee A's computer to request travel arrangements from the web site of Travel Agency A. Next, at operation 420, Employee A's computer receives the security policy from the web site of Travel Agency A. This policy requires that Employee A submit a security token with a claim establishing that Employee A is an employee of Company A before Employee A can access the discounted travel arrangements on the web site of Travel Agency A.

At operation 430, Employee A's computer forwards the policy to a claims authority, which in the present example is a security token service or STS operated by Company A. The STS of Company A can issue a security token with a claim establishing that Employee A is an employee of Company A. For example, the claim could simply be "Is Employee of Company A=True." Next, at operation 440, Employee A's computer receives a signed security token from the STS of Company A. The security token includes a computational token and a display token, with the computational token including the claim establishing that Employee A is an employee of Company A.

Control is then passed to operation 450, and Employee A's computer presents the summary of the claims from the display token to Employee A for review. Next, at operation 460, Employee A can decide whether or not to forward the security token to the web site of Travel Agency A based on the information in the display token presented to Employee A.

For example, if the only claim in the security token from Company A is that Employee A is an employee of Company A (e.g., "Is Employee of Company A=True"), the display token will list this claim for Employee A to review. If Employee A is comfortable revealing this information to Travel Agency A, Employee A can forward the security token to the web site of Travel Agency A at operation 465. Control is then passed to operation 470, and Employee A gains access to the requested discounted travel arrangements on the web site of Travel Agency A.

If Employee A instead decides at operation 460 not to forward the security token, control is passed to operation 480, and Employee A does not forward the security token to the web site of Travel Agency A. For example, if the security token from Company A includes more than a single claim about Employee A and Employee A identifies a claim (by reviewing the display token) that Employee A is uncomfortable sharing with Travel Agency A, Employee A can decide not to forward the security token. For example, if the security token from Company A not only includes a claim establishing that Employee A is an employee of Company A, but also includes a claim with Employee A's home telephone number, Employee A may not be comfortable sharing Employee A's home telephone number with Travel Agency A. In this situation, Employee A can review the display information from the display token of the security token, determine that the security token includes Employee A's home telephone number, and decide not to forward the security token to Travel Agency A.

Figure 9:
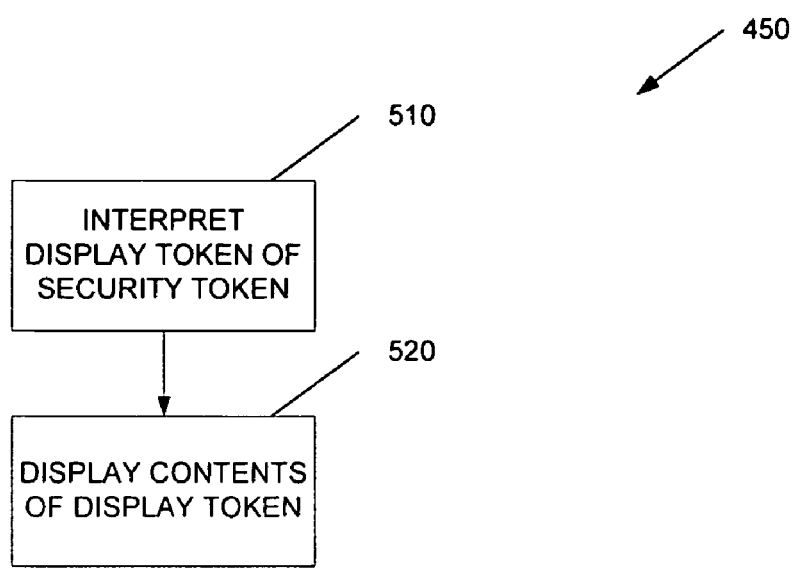
FIG. 9 illustrates an example method for interpreting and displaying a display token of a security token.

Referring now to FIG. 9, additional example details regarding operation 450 of method 400 related to review of the display token in the security token by the principal is shown.

At operation 510, the display token of the security token is interpreted by the principal. For example, in some embodiments, an application program such as a web browser plug-in or applet or another application is programmed to interpret the information contained in the display token. Next, at operation 520, the application is programmed to display the information to the principal using a graphical user interface such as a web browser interface. In alternative embodiments, other configurations are possible.

Figure 10:
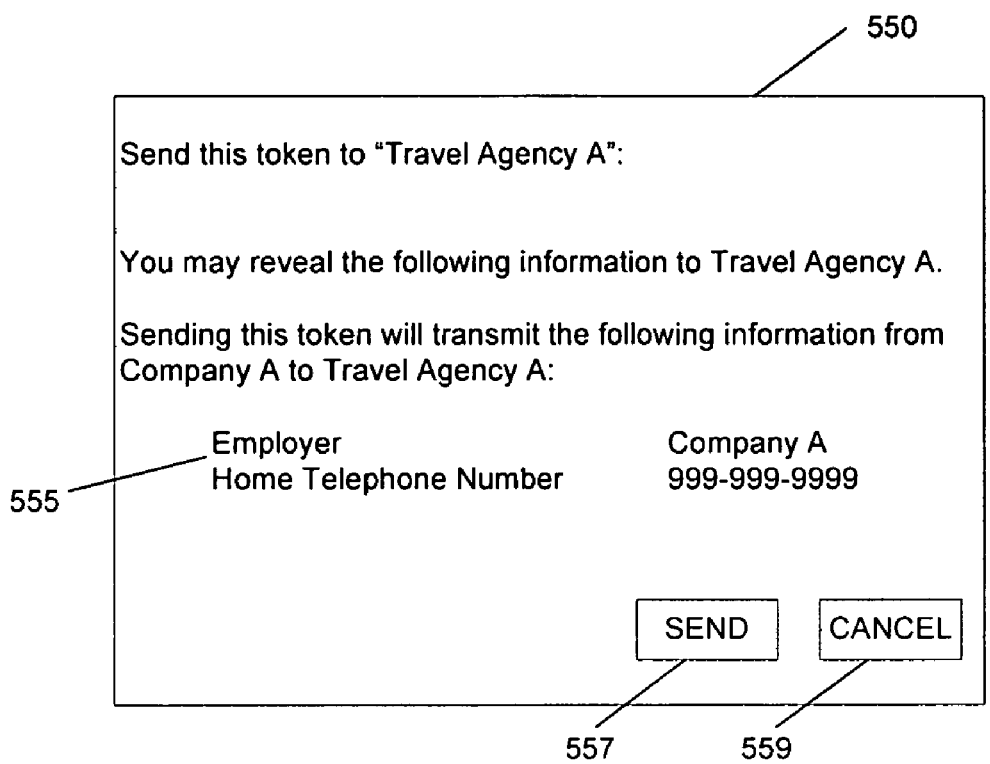
FIG. 10 illustrates an example user interface for displaying a display token of a security token.

For example, referring now to FIG. 10, an example user interface 550 is shown. User interface 550 displays information in a display token of a security token. User interface 550 includes a list 555 of the display information from the display token. In the example shown, the display information includes employer information (e.g., "Company A") and home telephone number (e.g., "999-999-9999"). User interface 550 also includes a send element 557 and a cancel element 559. The principal can select send element 557 to send the security token to the relying part (e.g., Travel Agency A), or select cancel element 559 to refrain from sending the security token.

In alternative embodiments, additional information can be provided in user interface 550. For example, in some embodiments, information about other security tokens that have been sent to a particular relying party can be listed, and/or information about where the particular security token currently being displayed has been sent previously can be listed. In yet other embodiments, information about the particular relying party to which the security token is going to be sent can be provided in the user interface, and/or links to obtain additional information about the relying party can be provided. Other configurations are possible.

Figure 11:
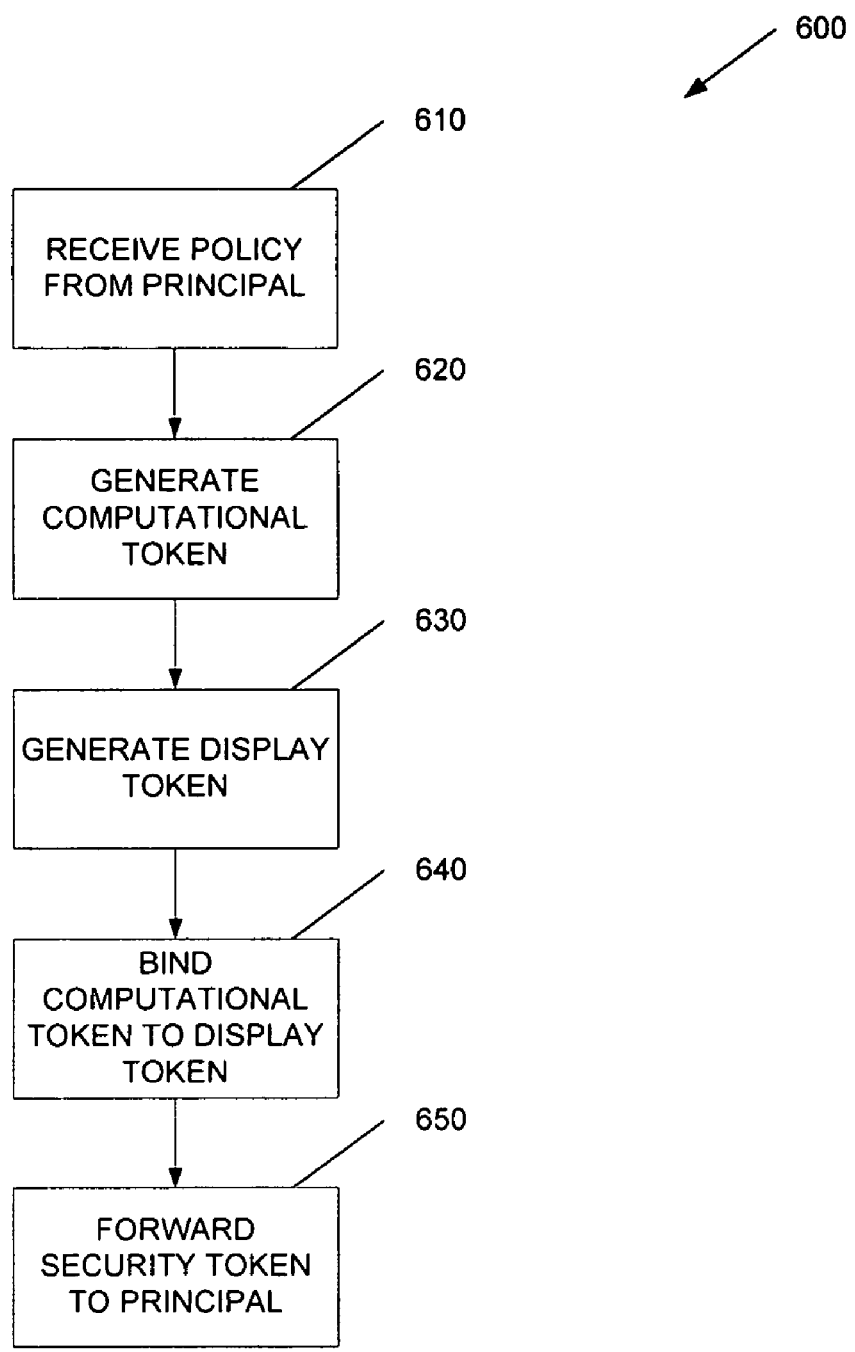
FIG. 11 illustrates an example method for generating a security token including a computational token and a display token.

Referring now to FIG. 11, an example method 600 for a claims authority and a claims transformer to generate a security token including a computational token and a display token is shown. Once again, method 600 is described with reference to the non-limiting example provided above, wherein the principal is Employee A, the relying party is Travel Agency A, and the claims authority and claims transformer are Company A.

At operation 610, the STS of Company A receives the policy of Travel Agency A forwarded by Employee A. Next, at operation 620, Company A generates a computation token including one or more claims required by the policy. At operation 630, a display token including display information about the claims in the computational token is generated. Next, at operation 640, the display token is logically bound to the computational token to generate the security token. Finally, at operation 650, the security token including the computational token and the display token are forwarded to Employee A bound together cryptographically in the response message.

In example embodiments, a display token can be provided by default in each security token issued by a claims transformer. In other embodiments, a display token is provided only if the principal requests the display token. An example of such a display token request included in a security token request is as follows.

```
<wst:RequestSecurityToken>
    <ic:RequestDisplayToken LangId="en-us"/>
</wst:RequestSecurityToken>
```

The optional attribute "LangId" indicates a language identifier for the display token using language codes specified in RFC 3066.

In example embodiments, if a security token lacks a display token, the principal is notified of the lack of a display token, and the principal can decide whether or not to forward the security token to a relying party. In other embodiments, if no display token is provided, no display information is presented to the principal.

In example embodiments, a principal can review the display information from the display token and decide whether or not to forward the security token to a relying party. In other embodiments, the principal can review the display information, but does not have the option to stop the forwarding of the security token to the relying party. In other words, once the security token is requested by the principal, the security token is automatically forwarded to the relying party once the security token is received by the principal.

In example embodiments, only the computational token portion of a security token is forwarded by the principal to the relying party. In other embodiments, the principal forwards the entire security token including both the computational token and the display token to the relying party.

Although example embodiments shown herein illustrate a security token that is forwarded by a claims transformer to a principal and then on to a relying party, in alternative embodiments the security token can be forwarded directly from the claims transformer to the relying party. For example, in some embodiments, one security token including a computational token (and possibly a display token) can be forwarded to the relying party, and another security token including a display token (and possibly the computational token) can be forwarded to the principal. Other configurations are possible.

Although the example embodiments shown herein illustrate a security policy requiring only a single claim and a single security token issued by one claims transformer, in other embodiments a policy can require multiple claims, and one or more claims authorities can issue one or more security tokens with one or more claims to satisfy the policy.

Although in some of the embodiments disclosed herein the principal is an individual, in alternative embodiments, the principal can be a company, an organization, a computer or other device, a service, or any other type of entity. For example, in one alternative embodiment, the principal is a device that is part of a network. The device can request information, such as a software update, from another device on the network functioning as a relying party. The relying party can require authentication of the identity of the device before the relying party provides the requested update. The device can request one or more claims required by the security policy of the relying party from one or more claims transformers, and the claims transformers can provide one or more security tokens including display tokens to the device. The device can be programmed to review the contents of the display tokens and decide whether or not to forward the security token to the relying party based on its contents. If the device forwards the security token to the relying party, the relying party can then complete the authentication process and provide the requested update to the device.

There can be various advantages associated with a security token including both a computation token and a display token with display information that can be reviewed by a principal. For example, a principal can efficiently review the contents of a security token using an application program on the client computer system of the principal programmed to interpret and display the contents of the display token. In addition, the principal's review of the contents of the security token enables the principal to have more control over the information shared with relying parties in the security token. Further, such a system including a security token with both a computational token and a display token bound together can provide an auditable trail should disclosure of unauthorized information about the principal occur.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A computer system associated with a claims authority that provides digital identities, the computer system comprising:
   one or more computer-readable media storing computer-executable instructions; and
   one or more processor units that execute the computer-executable instructions, the computer-executable instructions, when executed by the one or more processor units, cause the computer system to:
      receive a security policy of a relying party from a principal;
      generate a computational token, the computational token including one or more claims required by the security policy, the one or more claims associated with an identity of the principal, wherein the claims in the computational token are encrypted such that the relying party is able to decrypt the claims, the relying party being a party relying on the claims, wherein the claims in the computational token are in an encrypted format understandable by the relying party and not formatted for review by the principal;
      generate a display token, the display token including display information about information stated by the claims in the computational token, wherein the display information is configured to allow the principal to view the display token, the display information comprising a language identifier that indicates how content of the display token is localized, the display token comprising the following for each of the claims: a unique identifier of the claim, a display tag that provides a friendly name for the claim, a description element that provides a description of semantics of the claim, and a display value element that provides one or more displayable values for the claim;
      generate a security token that includes the computational token, the display token, and a digital signature over the computational token and the display token, the digital signature usable by the relying party to cryptographically verify that the security token originated from the claims authority; and
      send the security token to a computer system associated with the principal.

2. The computer system of claim 1, wherein the computational token conforms to a Security Assertion Markup Language (SAML) standard.

3. The computer system of claim 1, wherein the computer-executable instructions, when executed by the one or more processing units, further cause the computer system to provide the display token in a plain text format.

4. The computer system of claim 1, wherein the computer system associated with the principle is configured to display the friendly names of each of the claims, the descriptions of the semantics of each of the claims, and the displayable values of each of the claims.

5. A method for providing a digital identity, the method comprising:
   receiving, at a computer system associated with a principal, a security token from a claims authority, the security token including a computational token, a display token, and a digital signature over the computational token and the display token, the computational token including one or more claims associated with an identity of the principal, the display token including display information about information stated by the claims in the computational token, wherein the display information comprises a language identifier that indicates how content of the display token is localized, the display token comprising the following for each of the claims: a URI of the claim, a display tag that provides a friendly name for the claim, a description element that provides a description of semantics of the claim, and a display value element that provides one or more displayable values for the claim;
   wherein the claims in the computational token are encrypted such that a relying party is able to decrypt the claims, the relying party being a party relying on the claims, the relying party being able to use the digital signature to cryptographically verify that the security token originates from the claims authority, wherein the claims in the computational token are in a format understandable by the relying party and not formatted for review by the principal; and
   displaying, on a display device, the friendly names of each of the claims, the descriptions of the semantics of each of the claims, and the displayable values of each of the claims so that the principal can review the contents of the display token.

6. The method of claim 5, further comprising forwarding, by the computer system, the security token to the relying party.

7. The method of claim 6, further comprising receiving, at the computer system, input that indicates whether the principal requests forwarding of the security token to the relying party.

8. The method of claim 7, wherein forwarding the security token comprises: forwarding, by the computing system, the security token to the relying party when the input indicates that the principal requests forwarding the security token to the relying party, the computing system not forwarding the security token to the relying party when the input indicates that the principal does not request forwarding the security token to the relying party.

9. The method of claim 5, further comprising:
   sending, by the computing system, a request for information to the relying party,
   receiving, at the computing system, a security policy of the relying party in response to the request for information, the security policy specifying requirements for authentication; and
   in response to receiving the security policy, sending, by the computing system, a request for the security token, the request for the security token including the security policy.

10. A computer-readable medium that stores computer-executable instructions that, when executed by one or more processing units of a computing system associated with a principal, cause the computing system to perform steps comprising:
   sending, by the computing system, a request for information to a relying party,
   receiving, at the computing system, a security policy of the relying party in response to the request for information, the security policy specifying requirements for authentication;

in response to receiving the security policy, sending, by the computing system, a request for a security token to a claims authority, the request for the security token comprising the security policy;

receiving the security token at the computing system, the security token including a computational token, a display token, and a digital signature over the computational token and the display token, the computational token being formatted according to a Security Assertion Markup Language (SAML) standard, the computational token including one or more claims associated with an identity of the principal, the display token including display information specifying information stated by the claims in the computational token, the relying party trusting claims digitally signed by the claims authority, wherein the claims in the computational token are encrypted such that the relying party is able to decrypt the claims, wherein the claims in the computational token are in an encrypted format understandable by the relying party and not formatted for review by the principal, wherein the display token comprises a language identifier that indicates how content of the display token is localized, the display token comprising the following for each of the claims: a URI of the claim, a display tag that provides a friendly name for the claim, a description element that provides a description of semantics of the claim, and a display value element that provides one or more displayable values for the claim; and after receiving the security token, displaying, on a display device, the display information to the principal so that the principal can review the friendly names of each of the claims, the descriptions of the semantics of each of the claims, and the displayable values of each of the claims;

after displaying the display information, receiving, at the computer system, input that indicates whether the principal wants to forward the security token to the relying party; and forwarding, by the computing system, the security token to the relying party when the input indicates that the principal wants to forward the security token to the relying party, the computing system not forwarding the security token to the relying party when the input indicates that the principal does not want to forward the security token to the relying party.

11. The computer system of claim 1, wherein the computer-executable instructions, when executed by the one or more processor units further cause the computer system to: receive an initial security token from a claims authority, wherein the claims in the initial security token are not understandable by the relying party; and wherein a claims transformer causes the computer system to generate the security token by causing the computer system to: translate the initial security token into the security token, the claims in the security token understandable by the relying party.

* * * * *